US005692556A

United States Patent [19]
Hafner

[11] Patent Number: 5,692,556
[45] Date of Patent: Dec. 2, 1997

[54] PRECISION TEMPERATURE TEST CHAMBER

[76] Inventor: Erich Hafner, 881 Sycamore Ave., Tinton Falls, N.J. 07724

[21] Appl. No.: 181,898

[22] Filed: Jan. 14, 1994

[51] Int. Cl.[6] .................................................. F25B 29/00
[52] U.S. Cl. ........................ 165/30; 165/26; 165/61; 165/63; 165/64; 165/48.1; 219/400; 324/760
[58] Field of Search ..................... 165/30, 26, 27, 165/61, 64, 48.1, 63; 219/400; 324/760

[56] References Cited

U.S. PATENT DOCUMENTS

| 1,873,838 | 8/1932 | Gebhard | 165/30 |
| 2,583,906 | 1/1952 | Van Guilder | 165/30 |
| 2,731,807 | 1/1956 | Allyne | 165/30 |
| 4,572,283 | 2/1986 | Vanderschaaf | 165/61 |
| 4,984,628 | 1/1991 | Uchida et al. | 165/64 |
| 5,061,448 | 10/1991 | Mahe et al. | 219/400 |
| 5,123,477 | 6/1992 | Tyler | 165/48.1 |
| 5,211,713 | 5/1993 | Suyama | 165/30 |

FOREIGN PATENT DOCUMENTS

| 2056694 | 3/1981 | United Kingdom | 165/61 |

OTHER PUBLICATIONS

"Ultra Stable Constant temperature Baths and Circulators" Hait Scientific Provo Utah (No date).
"Truly Precise temperature chambers" Sigma Systems Corp. San Diego, California (No date).

*Primary Examiner*—John K. Ford
*Attorney, Agent, or Firm*—Robert M. Skolnik

[57] ABSTRACT

Milli-Kelvin temperature control in an air chamber by use of coarse and fine temperature control systems, and through the use of structure for handling air flow within the chamber. The coarse control system provides enough heating or cooling power to hold the chamber temperature at a value near, but below, the desired operating temperature, thus leaving a small differential to be made up by the fine control loop. The coarse control has a fairly large thermal time constant (in the order of tens of seconds). The fine control loop has a very fast response time (in the order of fractional seconds). This fast response time is achieved by the use of a heater having minimal thermal mass, a fast response sensor, and a high precision controller. Air circulation within the chamber is forced by an in-line assembly of a number of high volume blowers, all having a common shaft, driven by a constant speed motor. The formation of laminar flow patterns, with their tendency to spontaneous shift in the patterns, is prevented by the use of a limited number of deflectors, i.e. small metal plates placed at nearly right angles to the air stream, fastened to the chamber's ceiling.

14 Claims, 15 Drawing Sheets

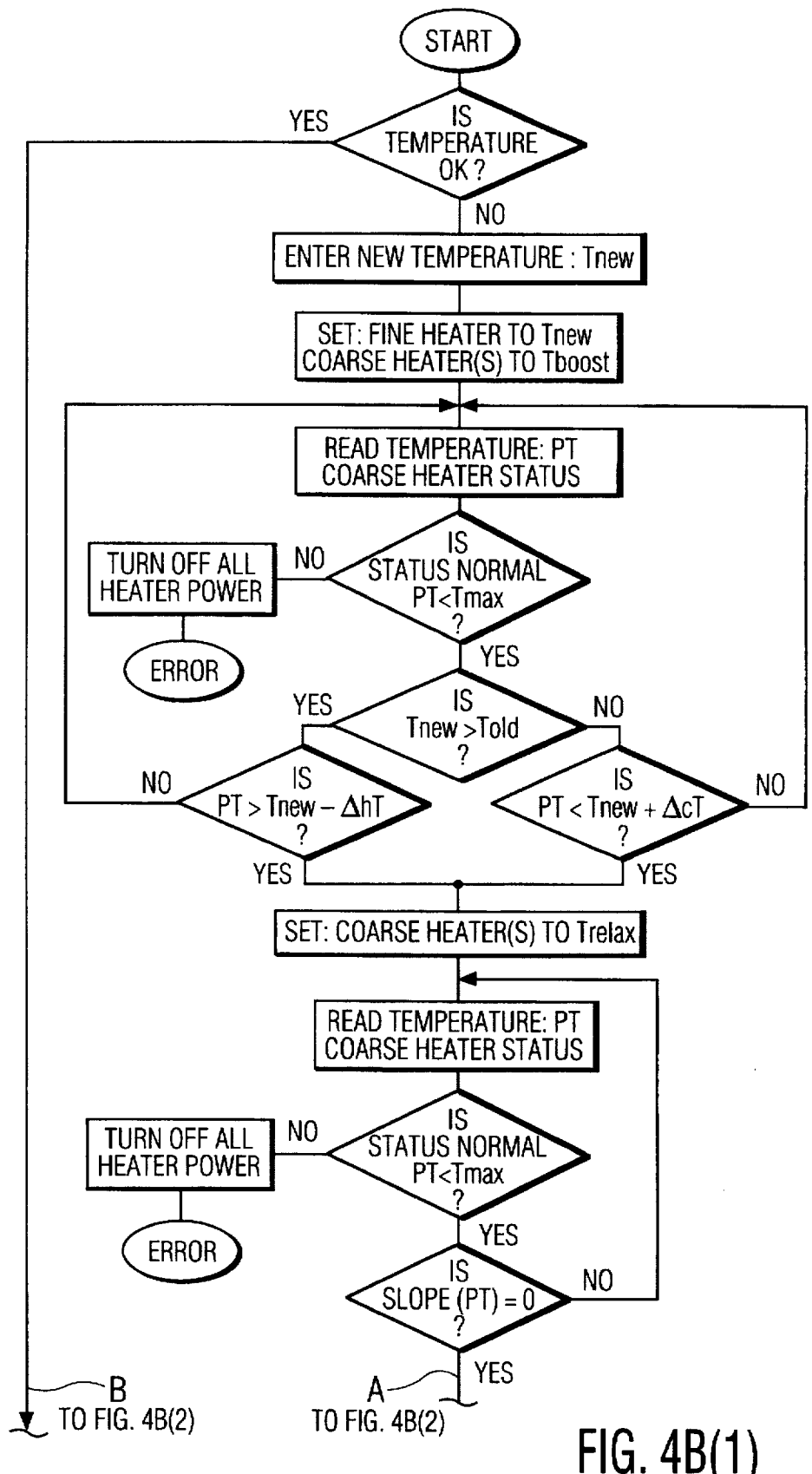
FIG. 4B(1)

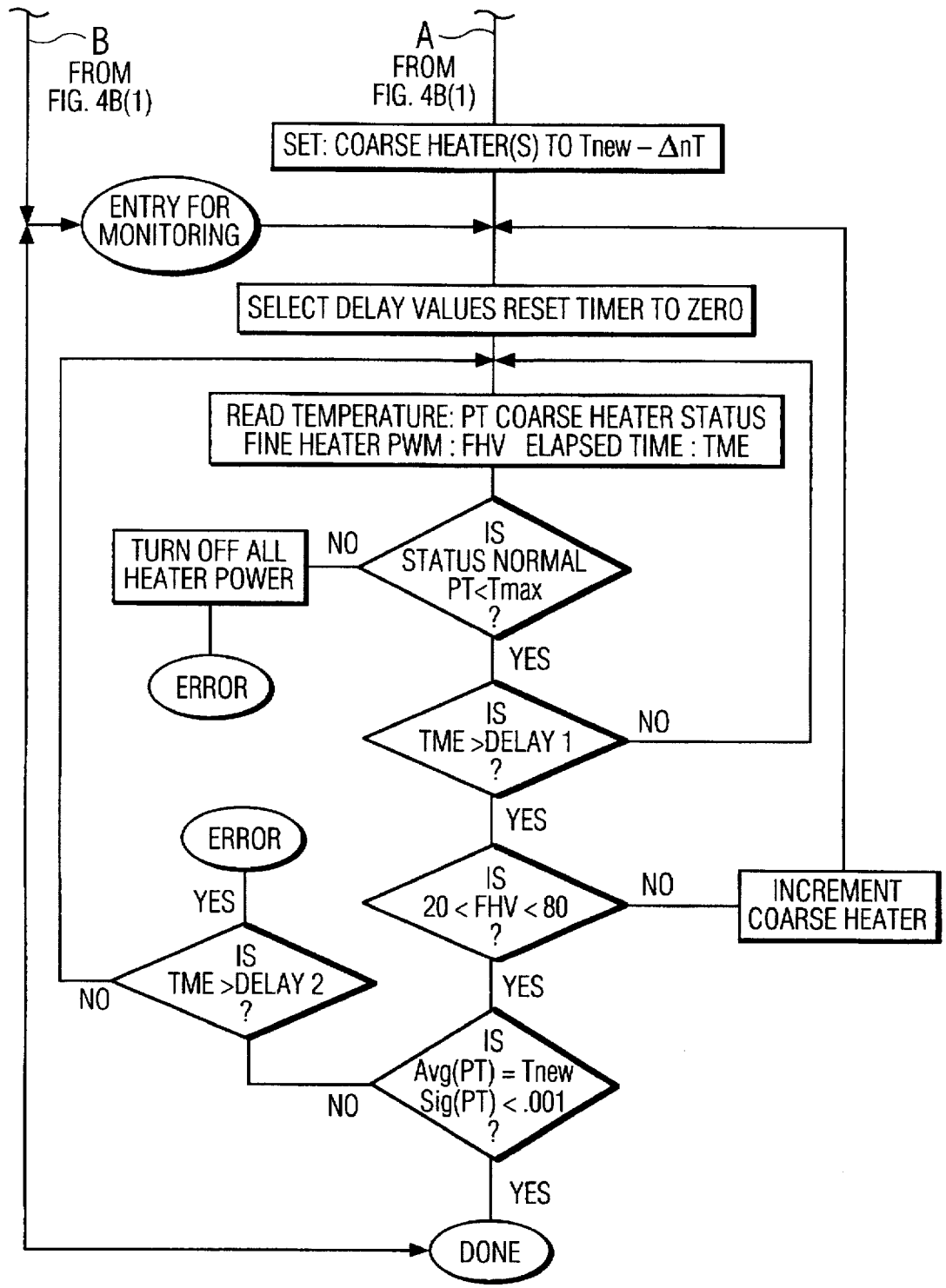
FIG. 4B(2)

PRECISION TEMPERATURE TEST CHAMBER

FIELD OF THE INVENTION

This invention relates to a temperature test chamber where the air temperature in the chamber is highly stable. Stability is defined herein as a temperature stability in the milli-Kelvin range.

DESCRIPTION OF THE PRIOR ART

Test chambers for evaluating the properties of electronic components or systems as a function of temperature are used extensively in industry. Typically, the chamber includes a double walled box with an efficient thermal insulator between the inner and outer walls and means for circulating air within the volume enclosed by the inner walls of the chamber. A heater, generally including resistance wire wound on a ceramic body, is used at elevated temperatures, while chamber temperatures below room ambient are obtained with the aid of a single or dual stage refrigeration system. The evaporator of the refrigeration system is located in the chamber.

Temperature control in the chamber is achieved by suitably modulating the electrical current through the heater wire and/or the amount of refrigerant reaching the evaporator. The degree of temperature control attained in quality air chambers is in the order of 0.1° C.; in advanced models such as the chambers sold by Sigma Systems Corp., San Diego, Calif., it can be 0.02° C. under favorable conditions. The prior art provided temperature stabilities in the milli-Kelvin range only by immersing the test objects in a liquid bath, as described in the specifications of the equipments offered by Hart Scientific, Provo, Utah.

SUMMARY OF THE INVENTION

The present invention provides milli-Kelvin temperature control in an air chamber by use of coarse and fine temperature control systems, and through the use of a new design for handling air flow within the chamber. The coarse control system provides enough heating or cooling power to hold the chamber temperature at a value near, but below, the desired operating temperature, thus leaving a small differential to be made up by the fine control loop. The coarse control has a fairly large thermal time constant (in the order of tens of seconds). The fine control loop has a very fast response time (in the order of fractional seconds). This fast response time is achieved by the use of a heater having minimal thermal mass, a fast response sensor, and a high precision controller. Air circulation within the chamber is forced by an in-line assembly of a number of high volume blowers, all having a common shaft, driven by a constant speed motor. The formation of laminar flow patterns, with their tendency to spontaneous shift in the patterns, is prevented by the use of a limited number of deflectors, i.e. small metal plates placed at nearly right angles to the air stream, fastened to the chamber's ceiling.

A principal object and advantage of this invention is the provision of a temperature test chamber which can maintain temperature control in the milli-Kelvin range.

Another object of the invention is the provision of a a highly stable temperature control chamber which does not use liquid baths.

A still further object and advantage of the present invention is the provision of temperature control in an air chamber by use of coarse and fine temperature control systems.

Another object of this invention is the provision of temperature stability through the use of a new design for handling air flow within the chamber.

A still further advantage of the present invention is the provision of a coarse control system for a temperature test chamber which provides enough heating or cooling power to hold the chamber temperature at a value near, but below, the desired operating temperature.

Another object of the present invention is the provision of a fine temperature control system which is designed to operate in a small differential of a few degrees to a few tenths of degrees Centigrade.

A still further object and advantage of this invention is the use of a coarse control having a fairly large thermal time constant (in the order of tens of seconds).

Another object and advantage of the invention is the provision of a fine control loop having a very fast response time (in the order of fractional seconds).

A still further object and advantage of this invention is the use of a heater having minimal thermal mass, a fast response sensor, and a high precision controller to obtain the fast response time.

A still further object and advantage of the invention is the use of an in-line assembly of a number of high volume blowers, all having a common shaft, driven by a constant speed motor to provide air flow within the chamber.

A still further object and advantage of the invention is the prevention of the formation of laminar flow patterns, by the use of a limited number of deflectors.

BRIEF DESCRIPTION OF THE DRAWINGS

These as well as further objects and advantages of the invention will become apparent to those skilled in the art from a review of the following detailed specification of my invention reference being made to the accompanying drawings in which:

FIGS. 4B(1) and 4B(2) is a flowchart of the computer program to change temperatures;

DETAILED DESCRIPTION OF THE INVENTION

The precision temperature chamber of this invention is part of an advanced measuring system, designed to evaluate, at constant temperature, the electrical characteristics of electronic components that are highly sensitive to temperature changes, such as, for example, quartz crystal units. The entire system is under the control of a computer microprocessor, with most of the computer program devoted to the measurement of component properties and the recording of the accumulated data. During steady state operation, at constant temperature, while the components are normally being measured, the chamber is under the control of subsidiary, autonomous controllers, and the role of the computer vis a vis the chamber is limited to periodic monitoring of the chamber status and to take corrective actions, if abnormalities are detected. The section of the computer program that affects the chamber operation directly is active only when the chamber temperature is changed from one value to another. A flowchart for that program section is included below.

Figure 1:
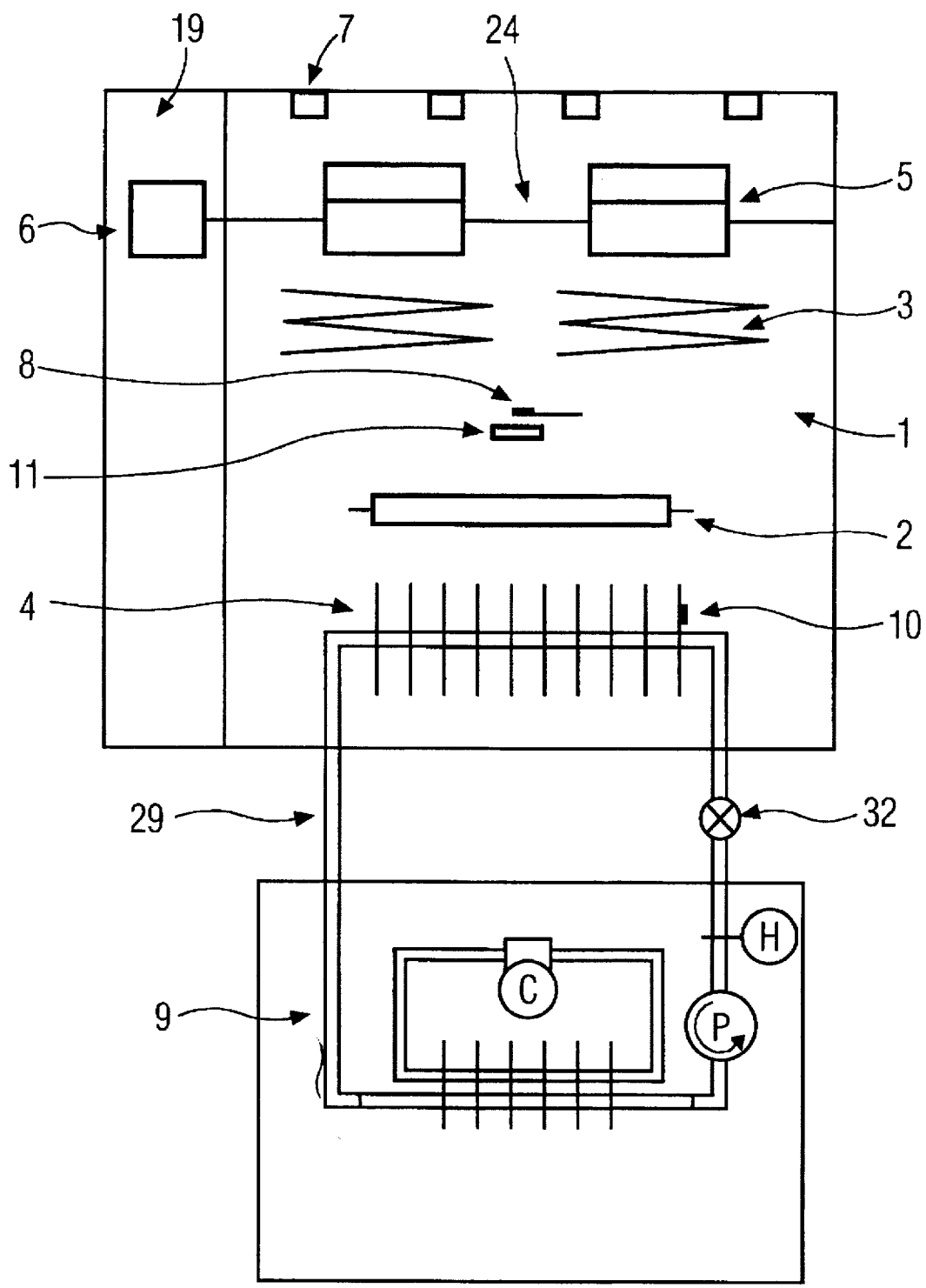
FIG. 1 is a diagrammatic view of the organization of the major subsystems in the invention.

FIG. 1 is a diagrammatic view of the organization of major subsystems in the preferred embodiment of my invention. In FIG. 1, the test chamber 1 has the following components mounted therein: booster heater 2; fine control heater 3; liquid-to-air heat exchanger 4, blower assembly 5 having a constant speed motor 6, air mixers 7 and the fine control loop temperature sensing probe 8. The heat exchanger 4 is connected through the walls of chamber 1 to an external unit 9 having pump P to circulate the transfer fluid and cooler C and heater H to suitably condition the temperature of the transfer fluid. A sensor 10 coupled to heat exchanger 4 generates the control signal representing the temperature of the fluid in the chamber. The fine control sensing probe 8 is mounted in close proximity to the location 11 of the electronic components under test.

Figure 2:
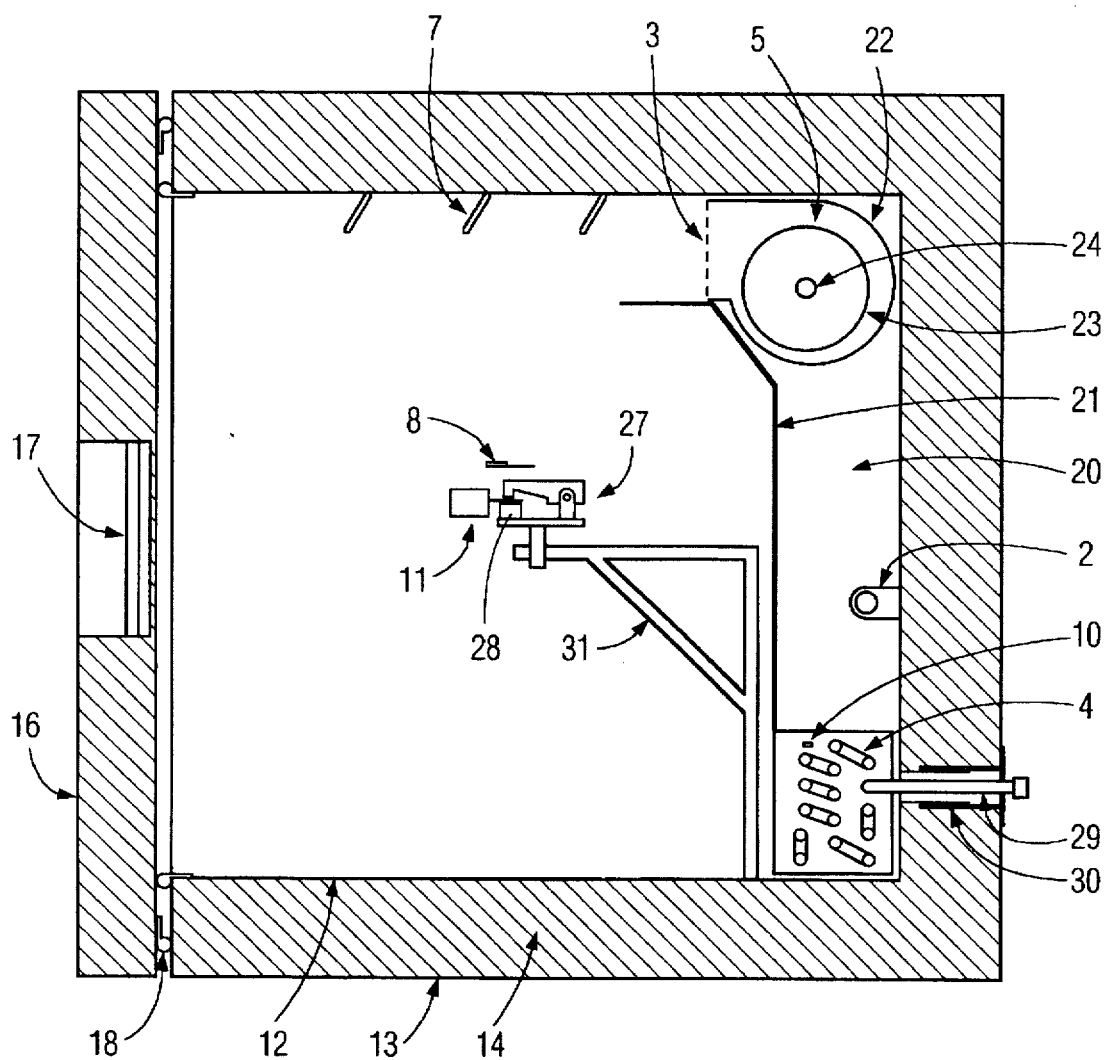
FIG. 2 is a side view (partially in section) of the chamber used in the invention.
Figure 2A:
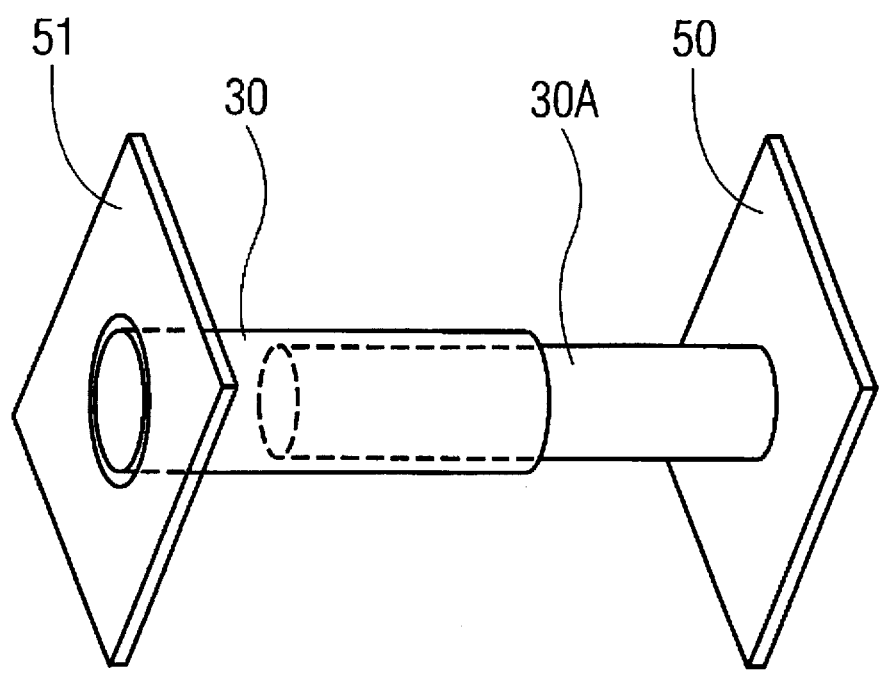
FIG. 2A is a perspective view of a sealing connection structure used for apertures in the housing for stationary connections in the present invention.
Figure 2B:
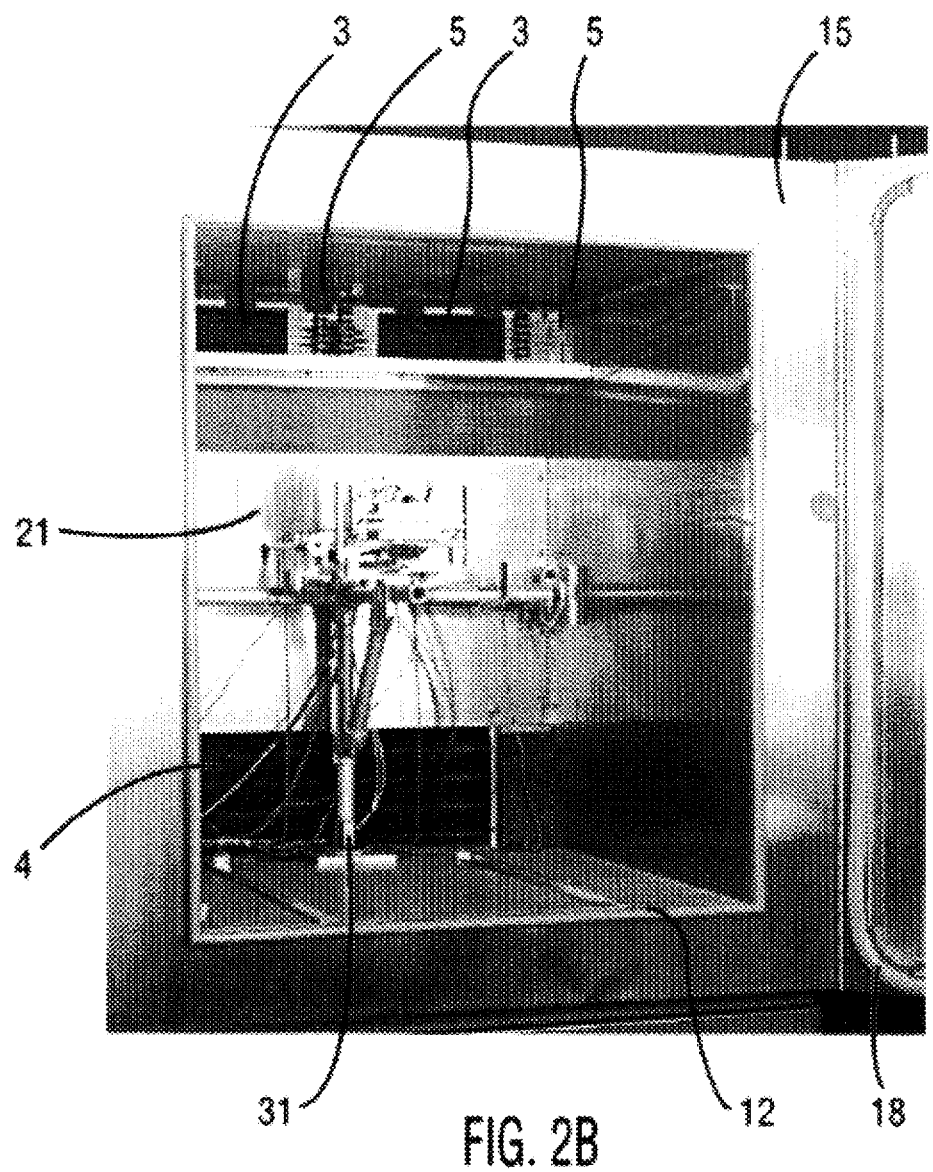
FIG. 2B is a perspective front view of the chamber used in the invention.

As shown in FIG. 2, and FIG. 2B, the chamber 1 includes inner and outer metal shells separated by an efficient thermal insulating material. In the preferred embodiment, the inner chamber 12 is a nearly cubic box formed from twenty-two gage stainless steel sheets. The outer chamber 13 is made of sixteen gage carbon steel. Insulation material 14 (approximately four inches thick) separates inner box 12 and outer box 13. When the inner box 12 is inserted into the outer box and the insulation, the flange 15 of the inner box meets the edges of the outer box so that the thermal insulator 14 is fully enclosed. A door 16 is provided to access the interior of chamber 1. This door has an inner stainless steel surface, approximately three inches of thermal insulation, and an outer steel surface. A triple pane window 17 is provided in the door 16. Hinges and a suitable clasp (not shown) are used to support and close the door. A dual set of silicone rubber gaskets 18 are provided to seal the door when closed against the flange 15.

An instrument compartment, 19 in FIG. 1, may be attached to the outer steel structure 13. Compartment 19 houses electronic equipment required for the operation of the system.

I have found that closed cell foam such as sold under the trademark FOAMGLAS boards may be used as the thermal insulation 14. I have also found that FIBERGLASS can be used as insulation 14 if the temperature range of the chamber is limited to values above room temperature.

Precautions are taken to prevent entry of unconditioned ambient air, particularly moisture, into the chamber 1. Seams and joints of the inner and outer chamber and the joints between them are sealed using chemical sealer and strips of aluminum foil. Necessary penetrations of the chamber's walls required to provide access to the interior of the chamber are also sealed. Provisions for backfilling the inner chamber and the space between the inner and outer chambers with dry inert gas, such as nitrogen, are provided.

The inner box 12 includes a plenum 20 formed therein by an extra sheet of stainless steel 21. The sheet 21 may be mounted five inches from the back wall of the inner box 12 and extends the entire width of the interior of the test chamber 1. Blower assembly 5 is mounted at the top of the plenum 20 and liquid-to-air heat exchanger 4 is mounted at the bottom of plenum 20.

Blower assembly 5 is designed to provide a flow rate sufficient to move the volume of air enclosed in chamber 1 at least once every five seconds through the blower. The blower 5 includes a housing 22 attached to the inner walls of inner box 12. Several blower wheels 23 are mounted on a common shaft 24. The ends of the shaft 24 protrude through the walls of the inner and outer walls of the chamber 1. Shaft 24 is driven by a brushless DC motor 6 mounted in instrument compartment 19. As shown in FIG. 3A, the rotor 6A of motor 6 is fastened directly to shaft 24, while the stator, 6B of the motor 6 is held in place by bracket 6C which is supported, via vibration isolator 6D, by bracket 6E, which is mounted to the outer box 13. The shaft 24 is supported by precision ball bearing 6F in the stator 6B and by a second bearing 6G (FIG. 3B) at the other end. As shown in FIG. 3B, the latter is mounted in holder 6H, which is supported, via vibration isolator 6I by bracket 6J, which is fastened to the outer box 13.

The speed of the brushless DC motor is servo controlled with reference to a crystal oscillator. Alternatively, a synchronous motor, whose speed is controlled with reference to the power line frequency, can be used. The diameter of the shaft 24 is dimensioned for sufficient strength to remove all significant vibrational resonances beyond the frequency of rotation. The preferred embodiment of the invention uses housing 22 manufactured by De-Sta-Co Model 350BHx6.68 and four squirrel cage blower wheels manufactured by Revcor Model B384-275S, on a three foot long precision shaft of ⅝" diameter rotating at 1600 RPM to deliver an airspeed of about 6 m/sec at the exhaust ports of the blower. The total flow rate is approximately 250 cft/min. The airflow out of the blower ports, which initially is mostly across the top of the chamber, is broken up and deflected, in part, into the body of the chamber by an array of deflectors 7. The deflectors are formed of pieces of 1.75" long×1.5" wide stainless steel shimstock fastened to the top of the inner walls of inner box 12 into the chamber so that they stand at an angle of about 110° to the airflow.

Figure 3:
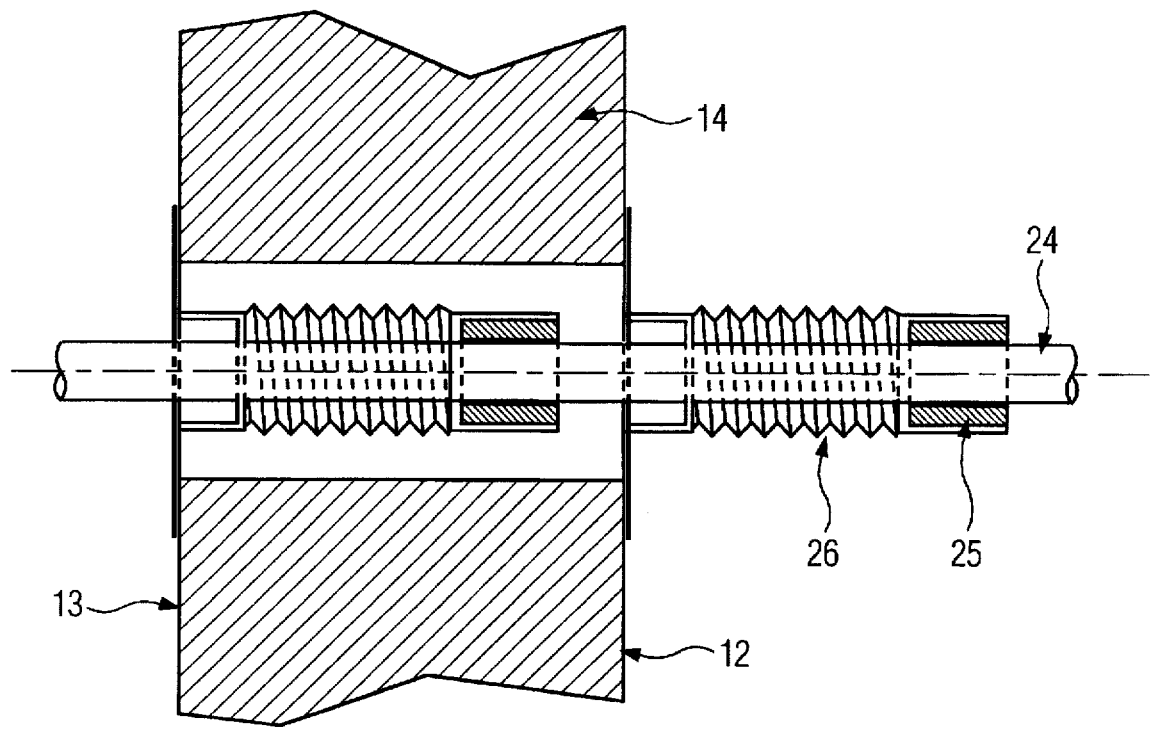
FIG. 3 is a side view, partially in section, of a sealing connection structure used for moveable shafts in the invention.
Figure 3A:
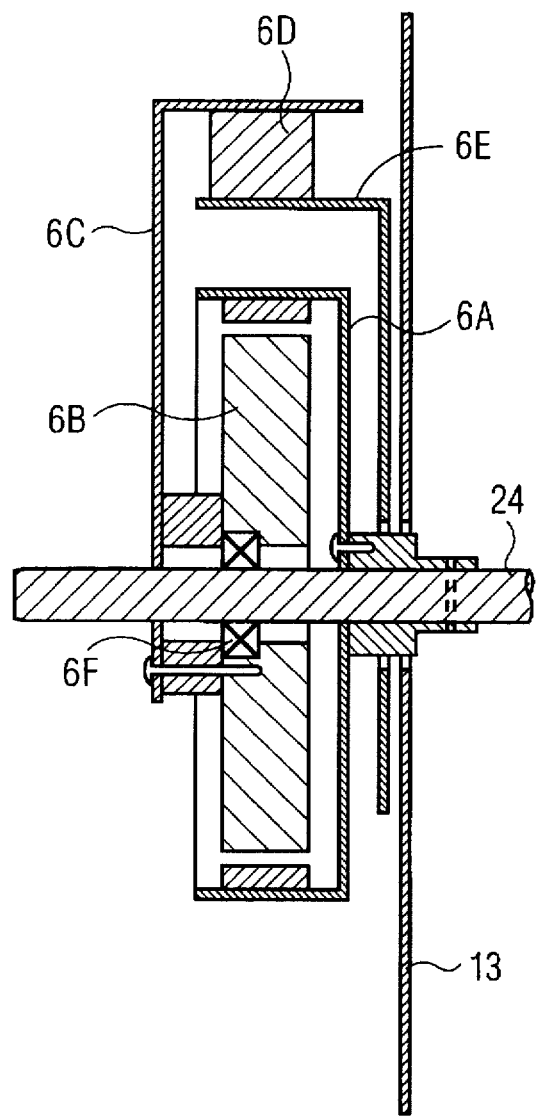
FIGS. 3A and 3B are side views, in section, of each end of the blower motor and shaft suspension used in the invention.
Figure 3B:
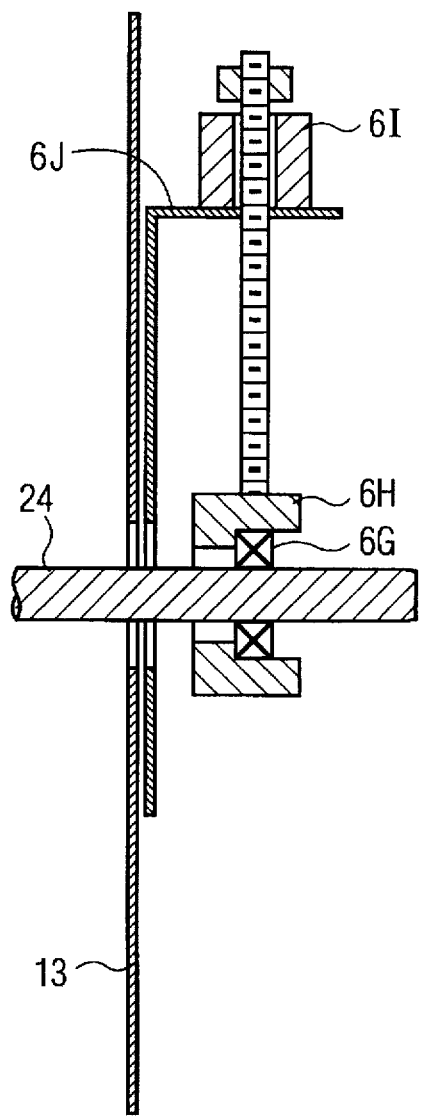

To curtail air exchange through the clearance holes for the shaft in the chamber walls and to restrict the intrusion of moisture at low temperature operation, a seal construction shown in FIG. 3 may be employed. The seal against the shaft is provided by bushings 25. To prevent alignment problems, the bushings 25 are retained in place so that they are free from strain, by corrugated TEFLON tubing or by metal bellows 26. The flanges of bellows 26 are fastened to the chamber walls and sealed with a chemical sealer such as a silicone compound such as Dow Corning Nr. 92-009.

Depending on the operating range of the chamber, specialty oils are needed for oil lubricated bushings, however, the more economical use of dry lubricated bushings, such as molybdenum disulfide impregnated NYLON, is generally adequate. Similar mounting structure is used in other chamber wall penetrations for moveable/rotating members. These include means for actuating clamp 27 associated with an electronic measuring head 28, and for a drive shaft (not shown) associated with a transport mechanism for the electronic circuit elements 11 whose electrical characteristics are to be measured by measuring head 28. The transport mechanism is discussed in connection with FIGS. 5 and 5A–F.

The seal used on chamber wall penetrations for stationary members is shown in FIG. 2 and 2A for heat exchanger fluid feed tubes 29. More particularly, two telescoping stainless steel or TEFLON tubing sections 30 and 30A, each equipped with a flange at one end (50 and 51, respectively), are used to provide (with the aid of a silicone compound), an air tight seal of the hole against the insulation 14. The gap between feed tubes 29 and tubing sections 30 and 30A is sealed with a foam-in-place material, such as polyurethane or silicone foam. This sealing technique is also used for other ports (not shown) in the chamber (such as electrical wiring ports).

Figure 5:
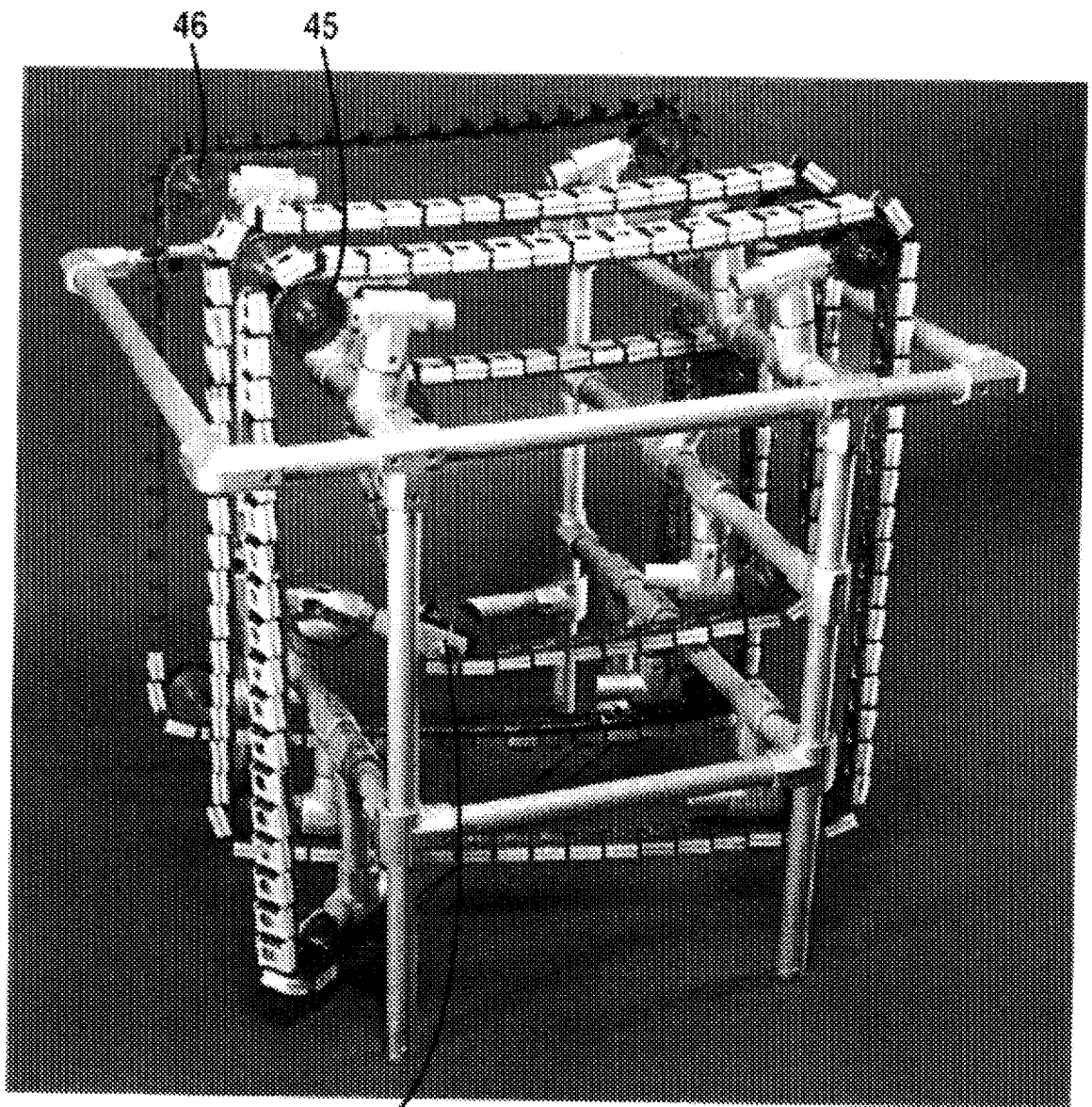
FIG. 5 is a perspective view of a component transfer mechanism for use in the chamber of FIGS. 1–2B.
Figure 5A:
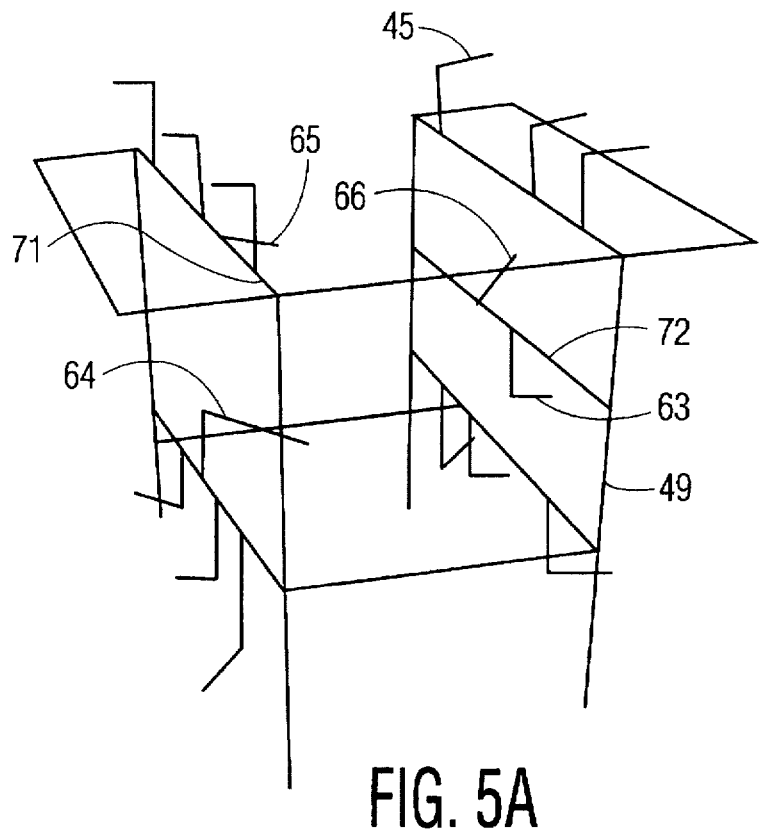
FIG. 5A is a diagrammatic view of a portion of the component transfer mechanism of FIG. 5.
Figure 5B:
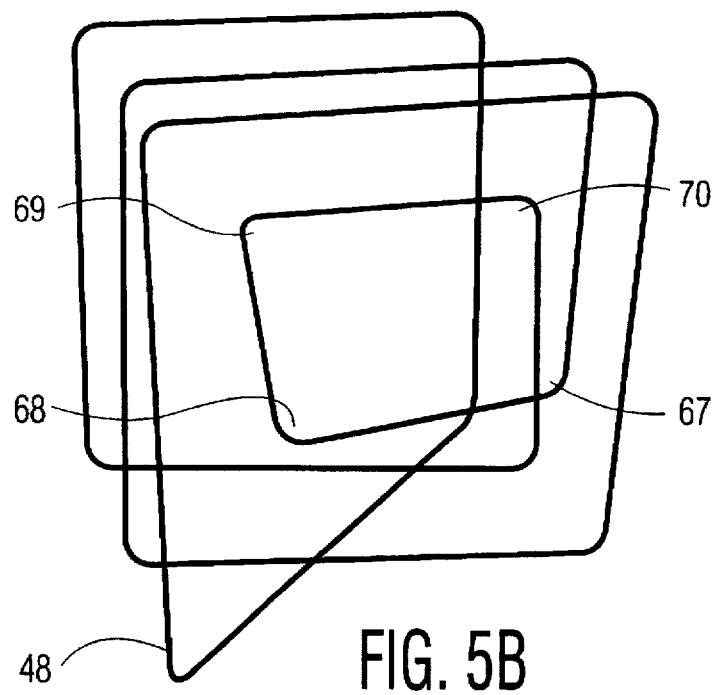
FIG. 5B is a diagrammatic view of another portion of the component transfer mechanism of FIG. 5.
Figure 5C:
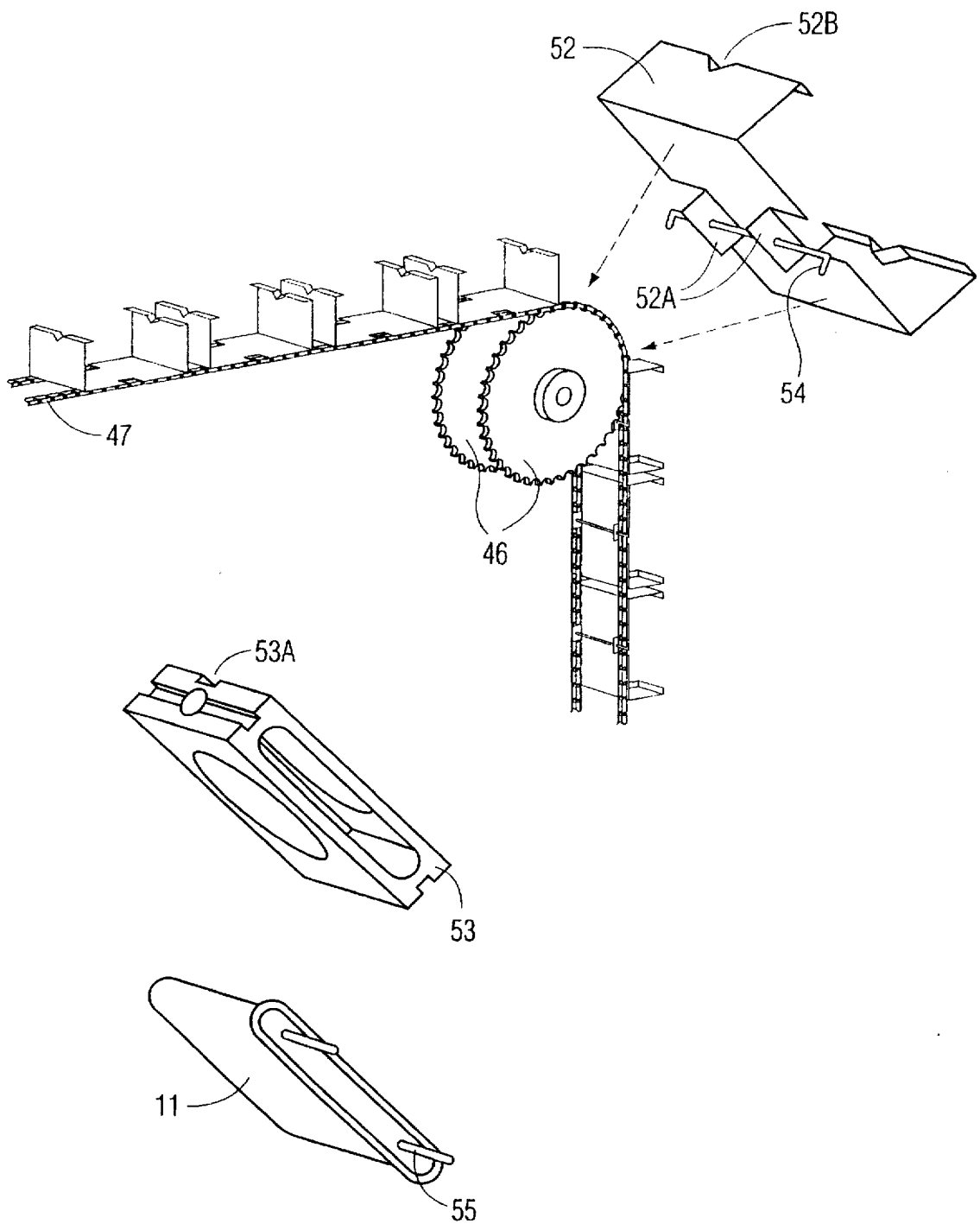
FIG. 5C is a perspective view of elements of the component transfer mechanism of FIG. 5.
Figure 5D:
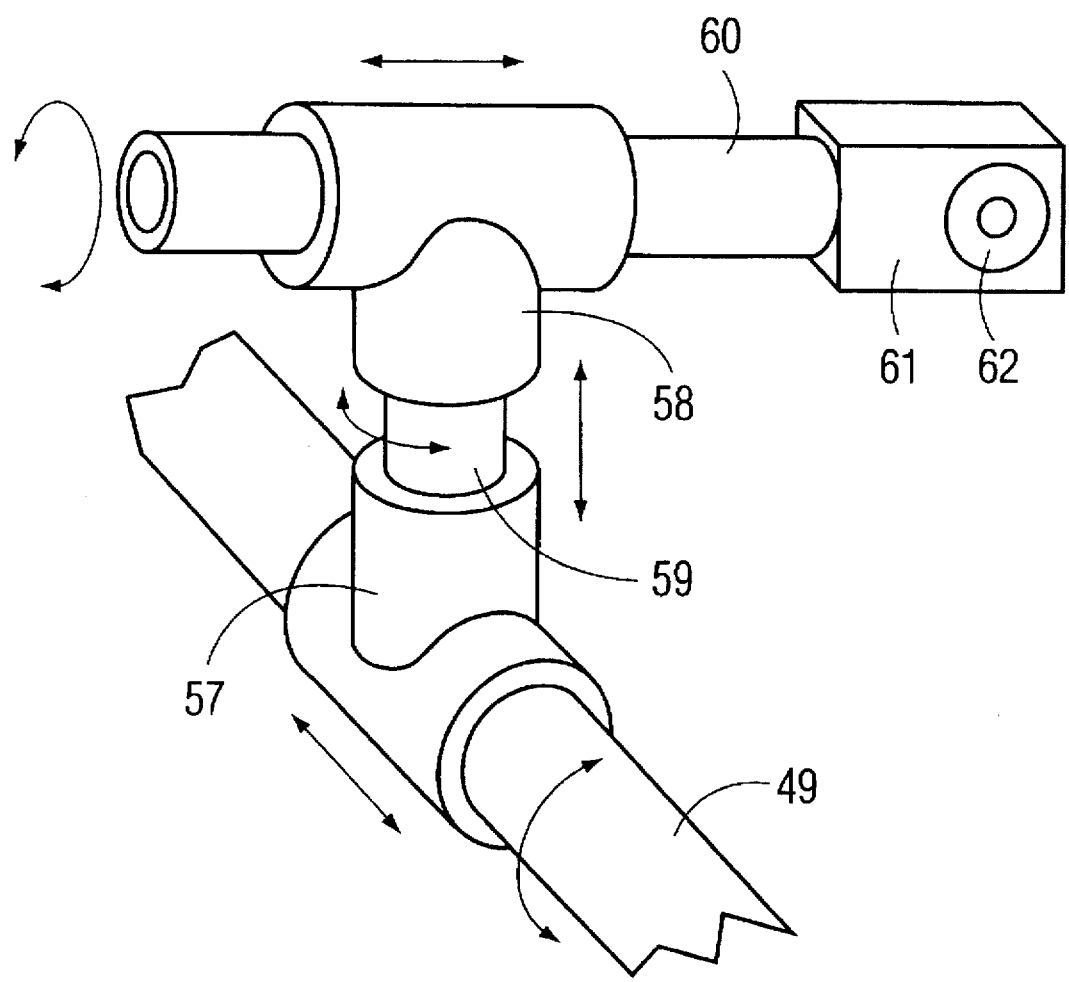
FIG. 5D is a perspective view of a sprocket wheel holder portion of the component transfer mechanism of FIG. 5.

Referring to FIGS. 5, and 5A–F, a component transfer mechanism for use in the chamber includes a framework 49 made of ½ IPS Schedule 40 aluminum pipe sections, assembled with the aid of standard handrail fixtures ("L's" and "T's") such as those sold commercially under the mark SPEED-RAIL by Hollaneder Manufacturing Company. The framework supports a plurality of sprocket wheel holders 45, each carrying two parallel sprocket wheels 46, 0.813" apart, on a common 0.250" shaft. The sprocket wheels 46 are arranged to support a parallel pair of ladder chains 47, which form a multi-turn endless loop 48, FIG. 5B. When located in the chamber, the section of the loop 48 between points 69 and 70 in FIG. 5B passes in front of the measuring head 28. A typical sprocket wheel holder 45 is shown in FIG. 5D. The sprocket wheels, not shown here, are located on either side of block 61, with the common shaft supported by ball bearings 62. The block 61 is fastened to pipe section 60, which, by means of the two SPEED-RAIL Tee's, is fastened to the framework 49. The two Tee's are connected by a short section of pipe 59. As indicated by the arrows in FIG. 5D, the arrangement provides six degrees of freedom, three rotational and three translational, that is, all the freedom needed to locate the sprocket wheel in space such as to support the desired run of the ladder chain loop 48. Once the sprocket wheels are brought in the desired location, the set screws in the Tee's, not shown, are tightened to fix the relative positions of the elements shown in FIG. 5D. The alignment of the teeth of the two sprocket wheels relative to one another provides for a further adjustment, which is important for the smooth movement of the chain.

Figure 5E:
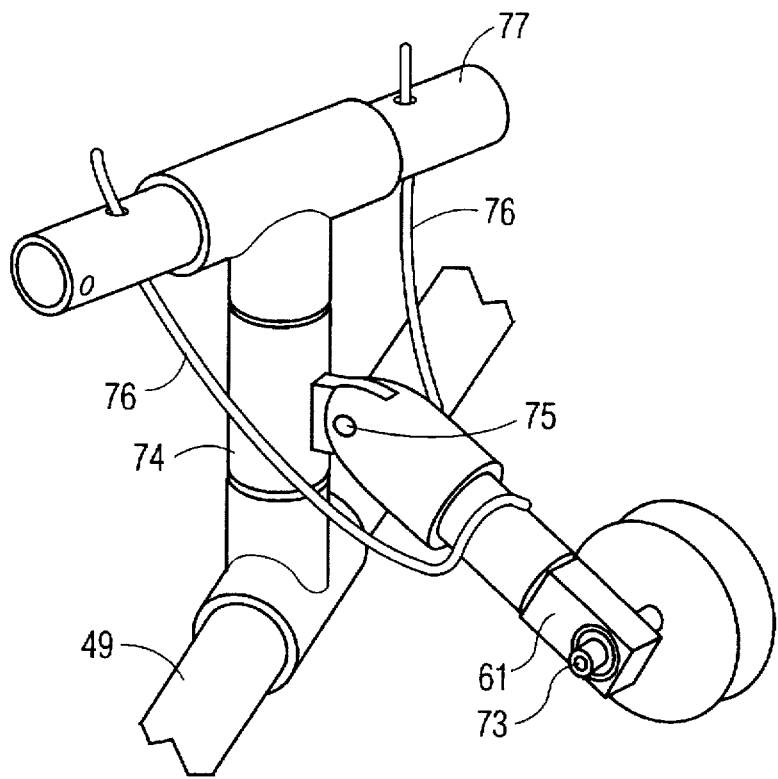
FIG. 5E is a perspective view of the sprocket wheel holder under spring tension.
Figure 5F:
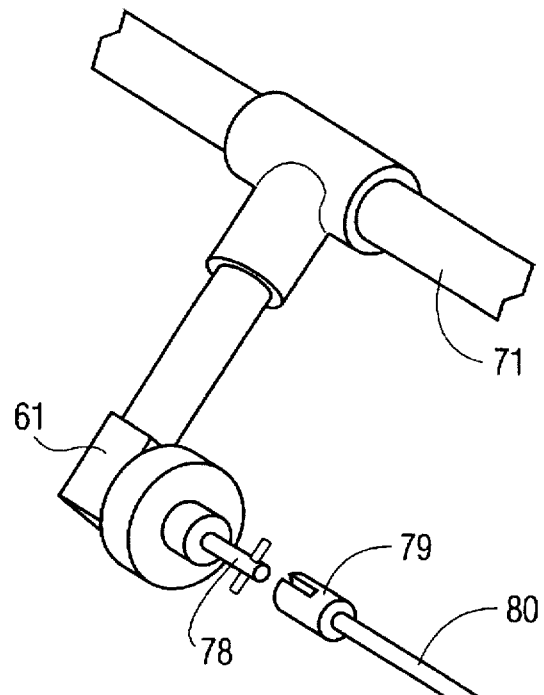
FIG. 5F is a perspective view of the motor driven sprocket wheel, with drive shaft.

The type of sprocket wheel holder illustrated in FIG. 6D is used for all corners of the loop 48 in FIG. 5B where the chain runs outside the core of the framework 49 in FIG. 5A and where the six degrees of freedom are required. The chain must run straight in front of the measuring head, between the points 69 and 70 in FIG. 5B, that is, the shafts connecting the sprocket wheel pairs on holders 65 and 66 in FIG. 5A must be parallel to the members 71 and 72 of the framework supporting these holders. The degrees of freedom provided by Tee 58 and pipe section 59 in FIG. 5D are not needed, and these elements can be deleted for holders 65 and 66 in FIG. 5A. The chain does run outside framework member 72, hence the sprocket wheels on holder 66 are on opposite sides of block 61. The purpose of the transport is to feed components to be tested at a constant temperature into the measuring head 28. Accordingly, as large a number of components as is practical, especially those just ahead of the measuring head, should be near the center of the chamber, where the temperature is most tightly controlled. The section of the loop between points 67 and 70 in FIG. 5B is brought into mid chamber for that reason. To support the loop in corners 68 and 69, the corresponding holders 64 and 65 must have their sprocket wheel pairs to one side of block 61, as illustrated in FIGS. 5E and 5F, with collar 73 in FIG. 5E securing the shaft on the opposite side. The holder 64 is spring loaded to keep the ladder chain loops taut. As shown in FIG. 5E, holder 64 makes use of a SPEED-RAIL part called "adjustable Ell", part 74, which includes a pivot 75. Spring 76 is formed of a 0.090" diameter alloy steel wire, spring tension is adjusted by turning pipe section 77 before tightening the set screws. Sprocket wheel holder 65 is illustrated in FIG. 5F. Its shaft 78 extends toward the rear of the chamber and has a 3/32 diameter dowel pin inserted near the end, at right angle to its axis. When the transport is seated in the chamber, this shaft end engages the mating coupling 79 at the end of drive shaft 80. The coupling 79 is spring loaded. The drive shaft extends through the rear walls of the chamber and is connected, outside the chamber, via a gear reducer, to a DC motor under computer control. The shaft 80 is supported by the shaft of the gear reducer outside the chamber and rides in an oversized hole in a bracket attached to the structure 31 in FIG. 2 inside the chamber. The main body of drive shaft 80 consists of a section of 0.250 OD stainless steel tubing with 0.010 wall thickness, to minimize thermal conduction along the shaft, and with it, ice formation where the shaft exits the rear of the chamber. As shown in FIG. 5C, the two parallel ladder chains carry retention clips 52 for the component holders 53. The retention clips are attached to the chains by means of 0.031" diameter brass rods 54 which extend through the tabs 52A of the clips 52 and the loops of the chains. The component holders 53 are located in the retention clips 52 by the indents 52B engaging the recesses 53A. The components 11 to be measured by the measuring head are inserted into the component holders. The components or the holders, have pins 55 for connection to the measuring terminals of the measuring head. The position of these pins, when the transport motor is energized and the chain is in motion, is sensed by an arrangement of fiber optic position sensors, which is used to stop the motion at the precise moment the pins are in the required position to be clamped to into the measuring head. The transport, thus constructed, permits a large number of components to be loaded into the chamber at one time and tested sequentially, while the chamber is at a particular temperature.

The fine control heating is effected by an array of bare 1 ohm/ft. resistance wires 3 (FIGS. 1–2) suspended in clothes line fashion directly in front of the output ports of the blower assembly 5. The temperature sensor for the fine control loop is a thin film resistance thermometer device (RTD) 8 attached to a section of piano wire. Sensor 8 is located in that part of the chamber 1 where the tightest temperature control is required. The electronic measuring head 28, such as the XOTEX Model MB-1 Microcircuit Admittance Bridge, is located in the center of the chamber 1 and RTD 8 is suspended in proximity to measuring head 28. The clamp 27 and head 28 and RTD 8 are mounted on a bracket 31.

Coarse control is provided by the liquid to air heat exchanger 4 through which a transfer fluid is circulated. The temperature of the transfer fluid is controlled by recirculating cooler 9 which is located externally of the chamber 1. Heat exchanger 4 is a coil and fin assembly and is mounted across the air intake of plenum 20. The external recirculator 9 may be a self-contained mechanical refrigeration system equipped with circulating pump P, compressor C and heater H, such as FTS Systems Model RC-00114-B. Alternatively, liquified gases such as $CO_2$ or Nitrogen can be used to cool the transfer fluid. Recirculator 9 is connected to heat exchanger 4 via heat insulated copper tubing. The recirculator is useable over the entire temperature range of the chamber (−70° C.−+150° C. in the preferred embodiment). The fluid circulating through the heat exchanger 4 must maintain relatively low viscosity at the low end of the temperature range and remain liquid at the high end of the temperature range. Dow-Corning Syltherm TXL or Dowtherm J are commercially available liquids which can be used. When the temperature testing program calls for frequent changes in the operating temperature, recirculating cooler 9 is used to speed cool down, even at higher temperatures. Booster heater 2, run at full power, is used to speed the warm-up. For long term tests at a constant high temperature, recirculating cooler 9 is not used; instead, booster heater 2 is used to provide the coarse control. In that case, booster heater 2 is controlled to generate a constant portion of its full output power which is sufficient to raise the chamber temperature to within the range of the fine control heater. Gravity circulation of the transfer fluid is prevented by closing cut-off valve 32. In the preferred embodiment, booster heater 2 is a 630 watt nineteen inch tube heater, such as that manufactured by Chromolox, Model TRI-2045, mounted in plenum 20 ahead of the blowers 5.

The temperature control system employs, under computer control, three subsidiary controllers, one each for the fine control heater, the booster heater and the recirculating cooler.

The controller for the recirculating cooler 9 is the commercially available Model 1991 P2C from Athena Controls Corp. Equivalents are available from a number of other manufacturers. It is connected to the computer via an RS232 interface which is active for monitoring and when the test protocol requires change of the chamber temperature. The sensor for this controller is located in heat exchanger 4 in the chamber 1.

Figure 4:
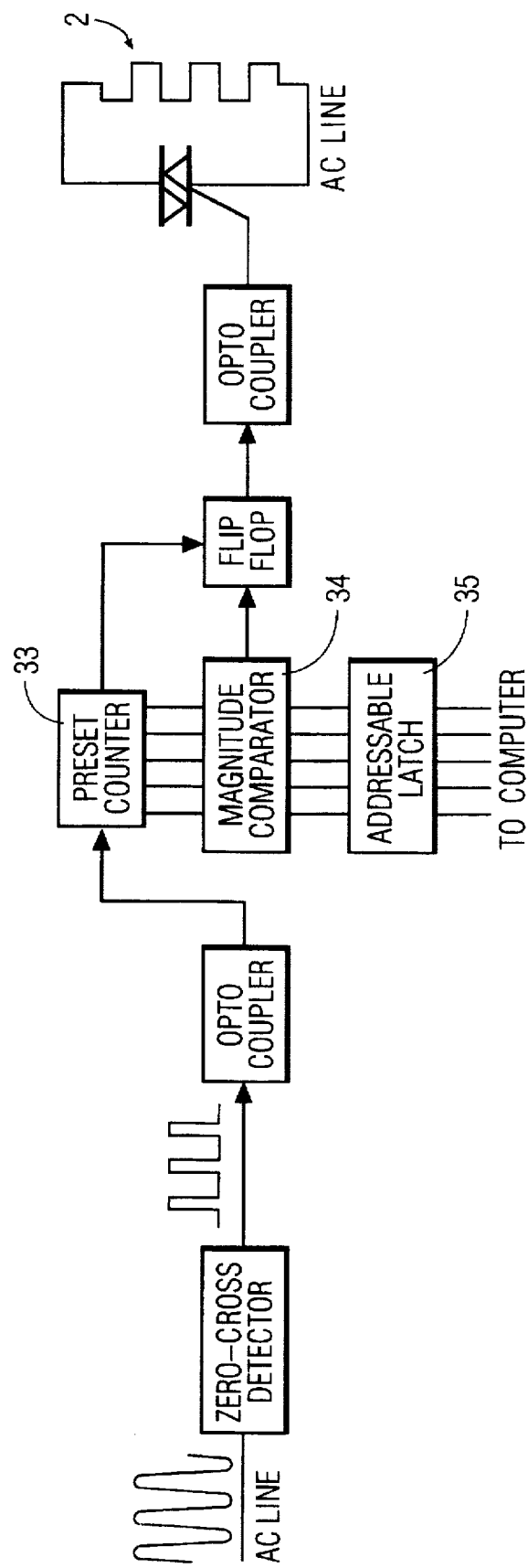
FIG. 4 is a schematic diagram of the control circuit for the booster heater.

The controller for booster heater 2 is shown in FIG. 4 and includes a 4 bit counter 33 and a 4 bit magnitude comparator 34 in an arrangement which counts the AC power line cycles in groups of sixteen and gates a silicon controlled rectifier (SCR) to let a fixed number of cycles, ranging from zero to sixteen in each successive group be applied to the booster heater 2. The number of cycles to be applied is set by computer command and stored in local memory 35 until a new command is received.

Figure 4A:
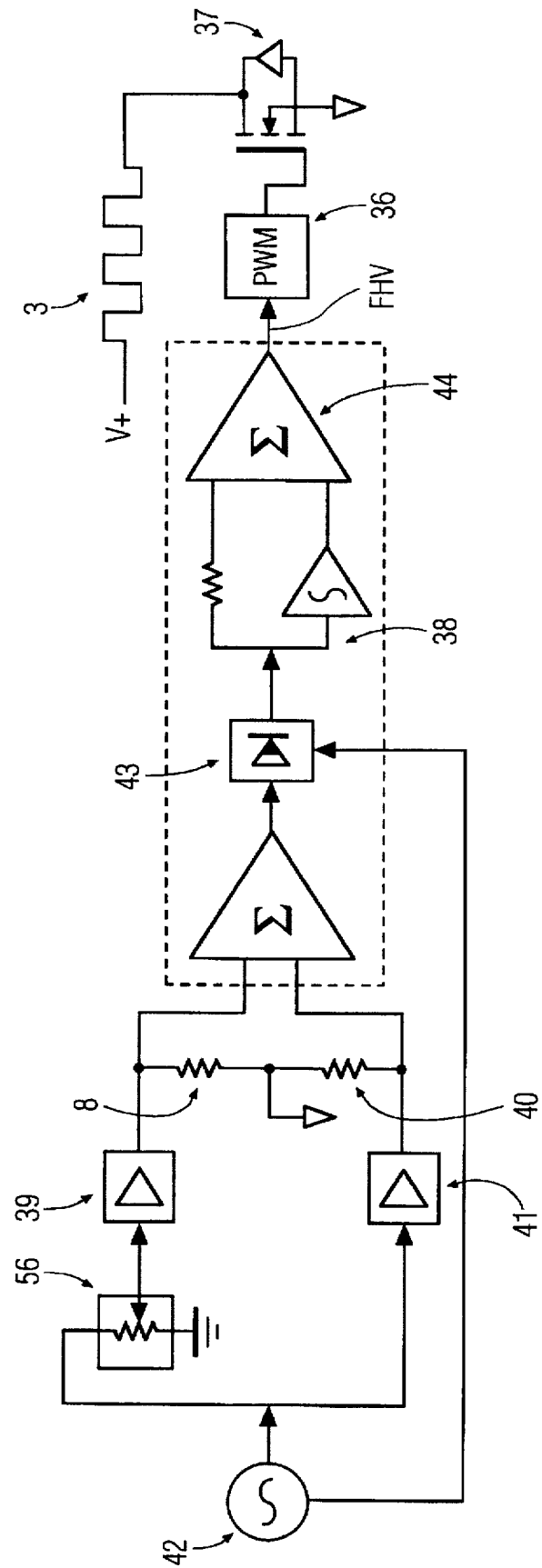
FIG. 4A is a block diagram of the control circuit for the fine control heater.

FIG. 4A is a schematic diagram of the controller for the fine control heater 3. The heater 3 is DC powered with the heater current controlled by pulse width modulator (PWM) 36, SGS-Thomson SG2524, acting on MOSFET 37, Motorolla IRFZ40. The PWM 36 is actuated by the voltage FHV, the output of the sensing segment in the dotted line block labeled 38 in the control loop. Sensing RTD 8 is connected to the input of sensing segment 38.

The sensing RTD 8 is a thin film platinum resistor having a resistance of 100 ohm at 0° C. and a time constant of less than one second. In the preferred embodiment, RTD 8 may be the Omega Model F3101. The RTD 8 is energized by a constant current source 39. The setting of the potentiometer circuit element 56 at the input of constant current source 39 controls the current magnitude of source 39. This potentiometer is set by computer command such that, at the desired temperature, the voltage drop across RTD 8 is equal to the voltage drop across reference resistor 40, manufactured by Vishay S102K 100R00 .01. The reference resistor 40 is energized by the fixed current from a second constant current source 41. The potentiometer 56 is implemented as a digital to analog converter (D/A), which is set in response to a fine heater control word from the computer. The control word is latched until superseded by a new command from the computer.

A finite difference between these two voltages indicates a deviation of the actual temperature of the chamber and the desired temperature. This voltage difference serves to steer the PWM 36 to deliver more or less power to the fine control heater, such that the differential voltage is decreased. The current sources 39 and 41 are excited by an audio signal at about 4600 Hz, derived from a state variable oscillator 42. DC excitation of the current source may also be used. In that case, an audio signal is generated by chopping the low level DC differential voltage for further amplification. In either case, a synchronous detector 43, such as Analog Devices AD630, is employed to derive a DC error signal of the proper polarity, the magnitude of which is proportional to the temperature error.

This proportional error signal, and its integral, are added in a combiner 44, whose output, the voltage FHV in FIG. 4A, is connected to the PWM 36. The time constant for the proportional response of the loop is less than 0.1 second. The time constant for the integrator is about 1 second. The use of high quality components in the loop is essential. Error sources to be considered with audio frequency excitation of the loop include undesirable shifts in the relative phases of the relevant signal branches, those with DC excitation include differential thermal EMF.

A separately controlled component oven (not shown) may be used for the critical elements of the fine control loop, to reduce the effect of ambient temperature variations on chamber temperature.

FIG. 4B is a flowchart of the computer program section that is active when the chamber temperature is to be changed from one value to another. It includes the section that is invoked for routine monitoring of the chamber and shows the corrective actions that are taken, if abnormalities are detected. Important quantities in the algorithm are the voltage FHV, shown in FIG. 4A at the input of the pulse width modulator 36, and PT, the current chamber temperature. FHV is normalized to a range from 1 to 100; a mid range reading is a condition for normal steady state operation. The thermometer providing the PT readings should have a time constant representative of the average thermal mass in the chamber; it should be located in the same general area as the fine heater control RTD 8. In the present embodiment of the invention, this thermometer is an integral, but functionally distinct, part of the measuring head 28, the XOTEX Model MB-1 Microcircuit Bridge. The thermometer should not be tied to a massive object introduced into the chamber for the purpose of "smoothing" the temperature readings, as this is both unnecessary and causes the stabilization times following temperature changes to become excessively long. If the time constant of the thermometer is too short, the temperature it indicates can, in a dynamic situation, be far from the temperature of the heavier objects in the chamber and stabilization to the milli-Kelvin domain is made more difficult, because these objects are extraneous heat sources, or sinks, apart from the coarse and fine heaters.

As shown in the flowchart, a change to a higher temperature calls for the fine heater control to be set to the desired endpoint temperature, $T_{new}$, while the coarse heater, which has an autonomous temperature controller, is set to a higher temperature, $T_{boost}$. With these settings, full, as the final temperature is approached, reduced, heater power is applied until the temperature PT, indicated by the thermometer, reaches a point $\Delta hT$ below $T_{new}$, at which time the coarse heater is set to a temperature $T_{relax}$, lower than $T_{new}$. PT does not reverse direction immediately, but continues to rise, leveling off at a temperature slightly higher than $T_{new}$. Just as the slope of PT reaches zero, the coarse heater is set to its final value at $(T_{new}-\Delta nT)$. From then on the fine heater will drive PT to $T_{new}$. The temperature change is completed when the fine heater voltage FHV, at the PWM input, is in mid range and the PT readings, averaged over 3 to 5 minutes, are equal to $T_{new}$ with a standard deviation of no more than 0.001° C. rms. A change to lower temperatures proceeds in the same basic manner as just described, except that here, $T_{boost}$ is lower and $T_{relax}$ higher than $T_{new}$. The algorithm is effective in approximating a critically damped system response, provided the calibrations of the coarse and fine heater controllers track the PT thermometer and provided the values of the differentials $(T_{boost}-T_{new})$, $(T_{new}-T_{relax})$, $\Delta hT$, $\Delta cT$ and $\Delta nT$, are reasonable approximations of their ideal values. The latter are all functions of the step height $(T_{new}-T_{old})$ and the thermal properties of the system. The parameters of these respective functions are determined empirically for the particular chamber-recirculator system in question.

In tests of my invention, the temperature stability attained is a function of the temperature gradient across the chamber walls. When the difference between the inside temperature of the chamber and ambient room temperature is less than about 20° C., the short term (second to minutes) and long term (hours) stability of the chamber, within a volume of about one cubic foot around the control RTD, is in the order of ±0.001° C. The stability attained deteriorates with increasing inside - outside temperature differential and reaches about ±0.005° C. at operating temperatures of –65° C. or 125° C. A step change of 10° C. takes about one hour.

Further modifications to the invention may be made without departing from the spirit and scope of the invention; accordingly, what is sought to be protected is set forth in the appended claims.

I claim:

1. An air chamber having milli-Kelvin temperature stability control comprising: coarse temperature control means in said chamber for continuously providing heating or cooling power to hold said air chamber temperature and a value near, but below a desired operating temperature; said coarse control means having a large thermal time constant; fine control means in said chamber for providing heating power to bring said air chamber temperature to a desired operating temperature, said fine control means having a very fast response time; in-line constant speed blower means in said chamber for creating and maintaining a broad uniform stream of constant speed air flow in said chamber; air deflector means mounted in said chamber in proximity to the output of said blower means for preventing laminar air flow patterns from being generated in said chamber and means connected to said fine control means for maintaining said air temperature stability to a milli-Kelvin degree level.

2. The air chamber of claim 1 wherein said fine control means includes heater means having minimal thermal mass, fast response sensor means thermally connected to said heater means for generating an electrical signal indicative of the temperature of said heater means, and high precision controller means connected to said sensor means and said heater means for controlling said heater means as a function of said electrical signal said heater means being located at the output of said blower means, said sensor means being located in proximity to said heater means and downstream from the output of said blower means.

3. The air chamber of claim 1 wherein said air deflector means includes a plurality of metal plates placed at nearly right angles to the air stream output of said blower means.

4. The air chamber of claim 1 wherein said last named means controls temperature stability within about +0.001° Centigrade, rms.

5. An air chamber having milli-Kelvin temperature stability control comprising: coarse temperature control means in said chamber for providing heating or cooling power to hold said air chamber temperature at a value near, but below, a desired operating temperature; in-line constant speed blower means in said chamber for creating and maintaining a broad uniform stream of constant speed air flow in said chamber; fine control means in said chamber located in the air stream output of said blower means for providing heating power to bring said chamber temperature to a desired operating temperature and means connected to said fine control means for maintaining the temperature stability within at least about +0.005° Centigrade, rms.

6. The air chamber of claim 5 wherein said fine control means includes resistance heater wire suspended in said chamber in clothesline fashion across said air stream output.

7. The air chamber of claim 5 wherein said coarse temperature control means has a long time constant and said fine temperature control means has a short time constant.

8. The air chamber of claim 7 wherein said coarse temperature control means includes a liquid-to-air heat exchanger in said chamber, and cooler/heater means mounted externally of said chamber for controlling the temperature of the transfer fluid for said heat exchanger.

9. The air chamber of claim 8 wherein said blower means includes air stream inlet and air stream outlet means mounted in said chamber.

10. The chamber of claim 9 further including an air plenum formed therein for controlling air flow to said air stream inlet; said coarse control heat exchanger being mounted in said air plenum ahead of said air stream inlet.

11. The chamber of claim 10 wherein said fine control heater includes resistance heater wire suspended in said chamber in clothesline fashion across said air stream outlet means.

12. The chamber of claim 11 wherein said air blower means includes a plurality of blower wheels mounted on a common shaft; said shaft being connected to a constant speed motor for driving said blower wheels.

13. The chamber of claim 12 further including air deflector means mounted in said chamber adjacent said air stream outlet means for improving air mixing in said chamber.

14. The air chamber of claim 7 wherein said coarse temperature control means includes an electrical resistance heater.

* * * * *